United States Patent
Badiano et al.

[15] 3,696,416
[45] Oct. 3, 1972

[54] RADAR INSTALLATION

[72] Inventors: Jacques Badiano, Chatenay-Malabry; Henri Commissaire, Ermont, both of France

[73] Assignee: Electronique Marcel Dassault, Paris, France

[22] Filed: April 27, 1970

[21] Appl. No.: 32,003

[52] U.S. Cl. ................................343/7.4, 343/16 M
[51] Int. Cl. ..............................................G01s 9/22
[58] Field of Search ..............................343/7.4, 16 M

[56] References Cited

UNITED STATES PATENTS

| | | |
|---|---|---|
| 3,239,836 | 3/1966 | Chubb et al. ................343/7.4 |
| 2,631,279 | 3/1953 | Bollinger et al. .........343/16 M |
| 3,126,542 | 3/1964 | Knutson et al. .........343/16 M |

Primary Examiner—T. H. Tubbesing
Attorney—Karl F. Ross

[57] ABSTRACT

A radar installation is provided in which the receiving aerial for the echoes is of the type used in monopulse radar, but in which the processing circuitry for delivering the required final information is of the character utilized in an electromechanical scanning system. The echoes picked up by the aerial are thus subjected to some of the conventional processing in monopulse systems and the three signals resulting from this partial processing are transformed into a single signal of the type delivered by an aerial of an electromechanical scanning radar.

9 Claims, 4 Drawing Figures

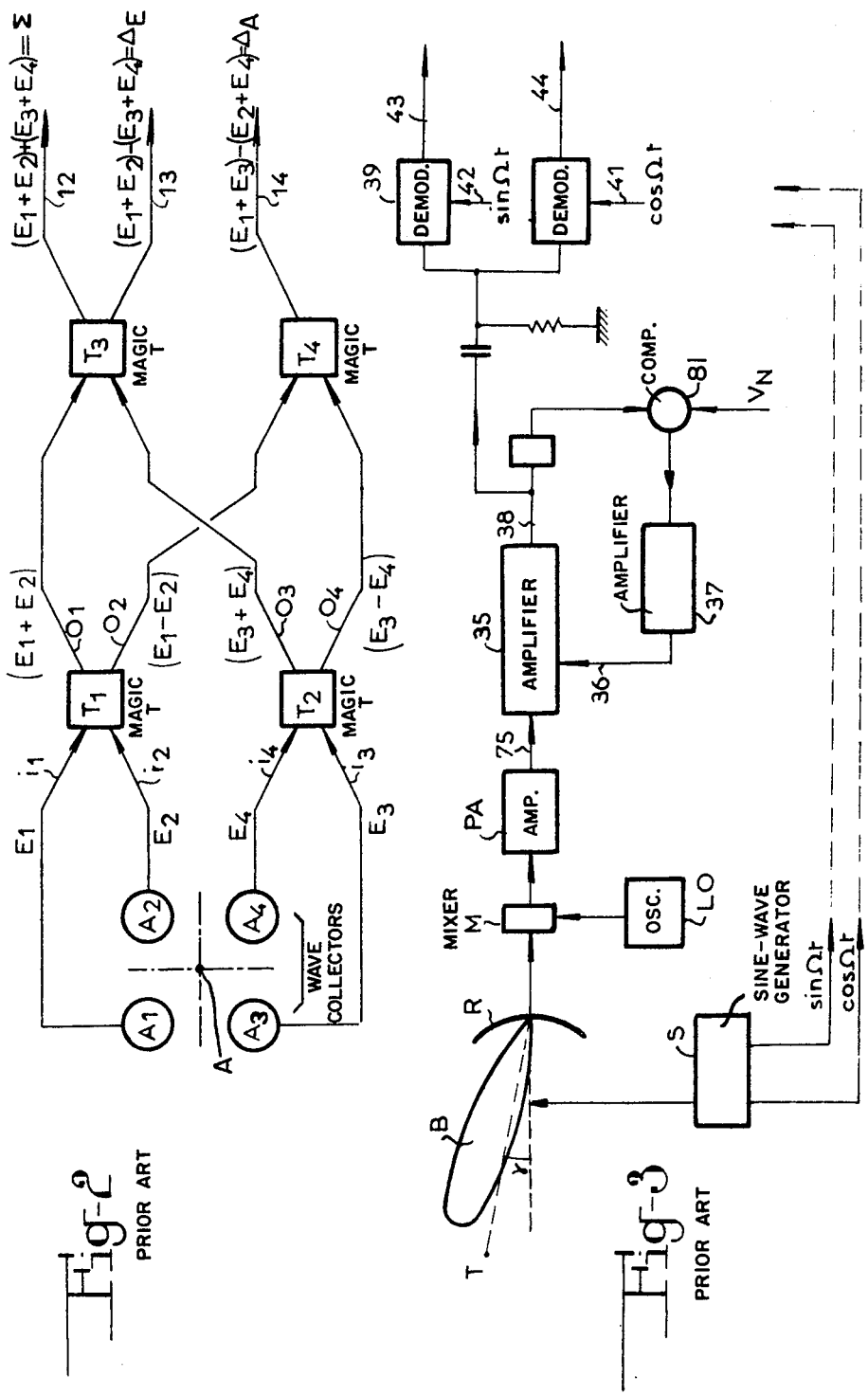

RADAR INSTALLATION

Our present invention relates to a radar installation.

It is known that in radar, particularly angular-tracking radar, use is made of a scanning system which may be electromechanical or purely electrical, for the precise determination of the direction of a target.

An electromechanical scanning system comprising means for causing the aerial of the radar to turn in such a manner that the axis of the main lobe of the polar diagram of the aerial describes a cone of revolution. In a radar comprising such a scanning system, the echo signal received, which may be in the form of an amplitude-modulated wave, is treated electrically to provide two voltages representative of the deviations of the direction of the target with respect to the axis of the cone in mutually orthogonal planes, for example the deviation or error in azimuth and the deviation or error in elevation.

This scanning system, which electrically processes the incoming echo signal by means of a single receiving network, nevertheless has disadvantages, particularly with regard to the weight and overall size due to the presence of the means for setting the aerial in rotation, so that its use on missiles or on board aircraft or the like involves difficulties.

Furthermore, because of the inertia of the rotating parts, the speed of scanning or sweep can be made neither as high nor as variable as may be desired for certain applications. Finally, since the scanning frequency can easily be detected, such a system is sensitive to jamming signals modulated at the frequency of the scan.

Another type of scanning system, known as a monopulse system, does not have the disadvantages referred to above. It comprises a receiving aerial for the radar echoes consisting of a plurality of wave collectors, the information supplied by the several collectors then being combined and treated in such a manner as to deliver signals from which there are obtained voltages representative of the elevational and azimuthal errors, for example.

This type of scanning system nevertheless has the disadvantage of necessitating more complicated electrical processing of the signals received by the aerial than that used in the mechanical scanning system, because of the number of wave collectors and the necessity of carrying out a relatively large number of operations on the signals supplied thereby.

It is an object of the invention to provide a device combining the advantages of both the above-mentioned systems without having the disadvantages thereof.

In a radar installation according to the invention, of whose receiving aerial for the echoes is of the type used in monopulse radar, the echoes picked up by this aerial are subjected to only some of the processing conventional in monopulse system; two of the signals thus obtained, present on separate channels, are heterodyned with two conjugate local oscillations and then combined into a single signal of the type delivered by an aerial of an electromechanical scanning radar, so that a processor such as that utilized in an electromechanical scanning system provides the required final information by heterodyning the combined signal with the same local oscillations.

Thus the installation according to the invention has the advantages associated with the use of a monopulse radar aerial, particularly with regard to weight and overall size, as well as the advantages of ease of processing of the single signal such as that delivered by a radar aerial for electromechanical scanning.

The invention will be well understood from the following detailed description, given by way of example and with reference to the accompanying drawing in which:

FIG. 2 is a diagram of a conventional monopulse radar aerial;

FIG. 3 is a diagram of a conventional radar system for electromechanical scanning and;

Figure 1:
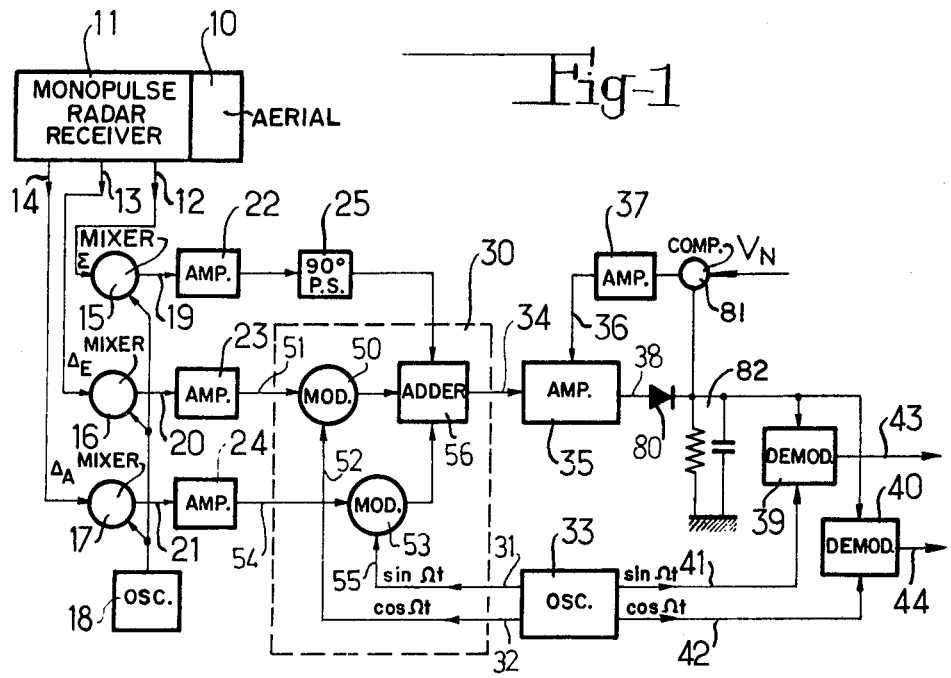
FIG. 1 is a block circuit diagram of a radar installation according to the invention.

The radar installation according to our invention comprises an aerial 10 (FIG. 1) of the type used in monopulse radar, that is to say a plurality of spatially separated wave collectors, each delivering signals corresponding to the electromagnetic field received, all these signals being processed in a receiver 11 which forms sums and differences to deliver, at its outputs 12, 13 and 14 respectively, UHF signals representing (a) the sum of the fields received by the different several collectors, (b) elevational-error information, and (c) azimuthal-error information.

Such a conventional receiving system 10, 11 is shown by way of example in FIG. 2. 11, the form of construction illustrated, its aerial comprises four quadrantal wave collectors A1, A2, A3, A4 disposed at the corners of a square centered on the aerial axis A. The collectors A1 and A2, which are located at adjoining corners, are connected to the inputs $i_1$ and $i_2$ of a device T1, known as a Magic T, whose outputs $O_1$ and $O_2$ generate respective signals representing the sum and the difference of the fields received by the collectors A1 and A2.

Similarly, the wave collectors A3 and A4 are connected to the inputs $i_3$ and $i_4$ of a Magic-T device T2 respectively supplying, at its outputs $o_3$ and $o_4$ the sum and the difference of the fields received by the collectors A3 and A4.

The outputs $o_1$ and $o_3$ constitute the inputs of a third Magic-T device T3 respectively delivering at its outputs 12 and 13 the sum and the difference of the signals applied to its inputs, while a fourth Magic-T device T4, which receives at its inputs the signals routed through the outputs $o_2$ and $o_4$, delivers at its output 14 a signal representing the difference of the signals applied to its inputs.

If E1 is the electromagnetic field received by the wave collector A1,

E2 is the electromagnetic field received by the wave collector A2,

E3 is the electromagnetic field received by the collector A3, and

E4 is the electromagnetic field received by the collector A4, then the signal present at the output $o_1$ is (E1 + E2), the signal at the output $o_2$ is (E1 − E2), the signal at the output $o_3$ is (E3 + E4), and that at the output $o_4$ is (E3 − E4).

It is therefore possible to take off:

at the output 12 a sum signal representative of (E1 + E2) + (E3 + E4) = Σ, at the output 13 a first (elevational) error signal representing the deviation of the angle of incidence of the received echoes from the axis of aerial A1—A4 in the vertical plane, i.e., (E1 + E2) − (E3 + E4) = $\Delta_E$, and at the output 14 a second (azimuthal) error signal representing the deviation in the horizontal plane, i.e., (E1 + E3) − (E2 + E4) = $\Delta_A$.

As is usual in monopulse radar installations, the signals transmitted over the channels 12 to 14 are combined, in mixers 15, 16 and 17 (FIG. 1), with a signal delivered by a local oscillator 18, the resulting intermediate-frequency signals being routed via channels 19, 20 and 21 to respective amplifiers devices 22, 23, 24.

According to the invention, the three sum and difference signals delivered by the amplifiers 22, 23, 24 constitute the input signals for a processor 30 delivering at its output a single signal similar to that which is taken off from an aerial of an electromechanical scanning radar.

According to the invention, the processor 30 is fed from the outputs of the amplifiers 22 to 24 — with interposition in the output lead of the amplifier 22, of a 90° phase shifter 25 — and receives, at two other inputs 31 and 32, the signals emitted by an oscillator 33 generating a conjugate pair of simulated sweep signals.

At its output 34, the processor 30 delivers a signal adapted to provide, after demodulation in a network similar to that used in radar systems with electromechanical scanning, signals representing the deviation in elevation and in azimuth, respectively.

The processor 30 comprises a first amplitude modulator 50 with double sideband and carrier suppression, receiving at one of its inputs 51 the output signal of amplifier 23 and at another input 52 the first of the two conjugate oscillations, for example in the form $\cos\Omega t$, delivered by the oscillator 33. A second amplitude modulator 53 with double sideband and carrier suppression receives, at one input 54, output the signal of amplifier 24 and at another input 55 the second of these oscillations in quadrature with that delivered over the channel 32, for example in the form $\sin\Omega t$. The signals leaving the modulators 50 and 53 and the phase shifter 25 are combined in an adder 56, whose output constitutes the input of a processing network of the type used in electromechanical-scanning radar, the construction of such a network being discussed below with reference to FIG. 3.

Such a network comprises, in the known scanning system, a linear amplifier 35 with automatic gain control, (FIG. 3) receiving at one of its inputs 75 an input signal which, delivered by an aerial R and mixed in a mixer M with a modulation signal delivered by a local oscillator LO, then passes through an intermediate-frequency pre-amplifier PA. At its other input 36, the linear amplifier 35 receives from a comparator by ways of an automatic-gain-controlled amplifier 37, a feedback voltage derived from its own output signal by comparison thereof with a reference signal $V_N$. Thus the amplifier 35 delivers, at its output 38, a signal of constant mean value. This signal is then demodulated in stages 39 and 40 which receive, on the one hand, this stabilized output signal and, on the other hand, at inputs 41 and 42 a pair of conjugate signals of the form $\sin\Omega t$ and $\cos\Omega t$ delivered by a sine-wave generator S, controlling the rotation of the beam B of the aerial R, at an angular frequency or pulsatance $\Omega$ related to the sweep frequency of beam B.

The output of amplifier 35, rectified by a diode 80 and smoothed in an integrating circuit 82, reaches the demodulators 39 and 40 described with reference to FIG. 3. The elevational and azimuthal error signals appear at the outputs 43 and 44 of these demodulators, respectively.

Figure 4:
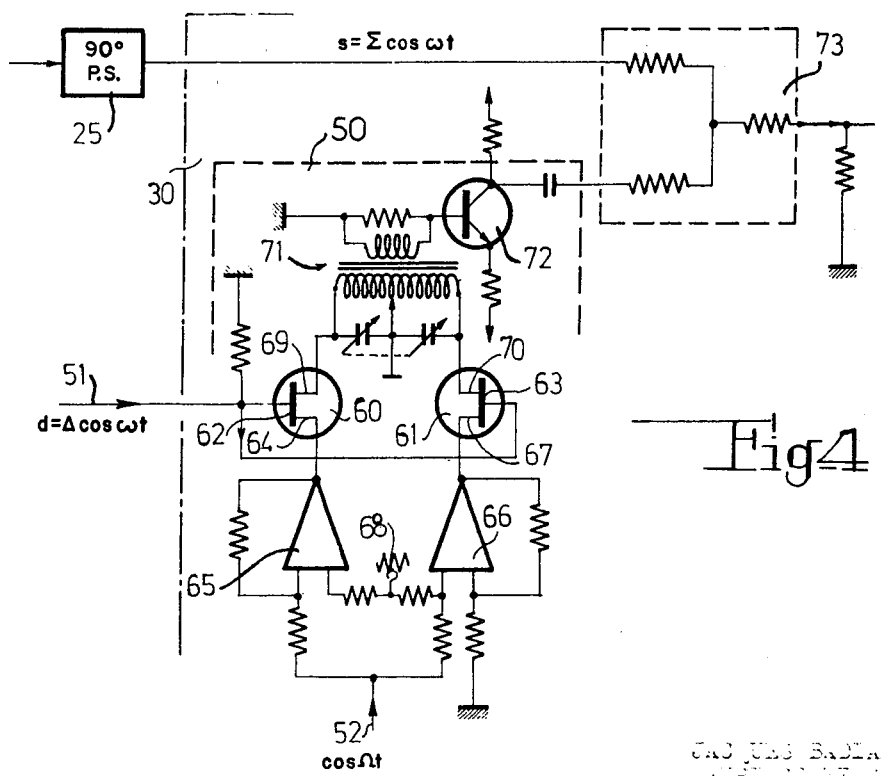
FIG. 4 is an electrical diagram of a component of the system shown in FIG. 1.

FIG. 4 shows one form of construction of the modulator 50 or 53 in the processor 30 of our improved system. As illustrated, the amplitude modulator 50 comprises two matched field-effect transistors 60 and 61, for example of the type 2N3921, receiving, at their gates 62 and 63, the signal delivered by the elevational-error amplifier 23 and routed over the channel 51. The source 64 of the transistor 60 is connected, by means of an amplifier 65, to a conductor 52 on which there is present the simulated sweep signal $\cos\Omega t$, which is likewise applied by way of an amplifier 66 having the same gain as amplifier 65, to the source 67 of the transistor 61. The amplifiers 65 and 66 are so designed that the signals at their outputs are in phase opposition.

A potentiometer 68, interposed between the amplifiers 65 and 66, enables the neutral point of the transistors 60 and 61 to be selected so as to take into consideration, on the one hand, the dynamics of the intermediate, frequency signal and, on the other hand, the level of the parasitic rays (even and odd harmonics of the pulsatance $\Omega$).

The signals present at the drains 69 and 70 of the transistors 60 and 61 are added in a transformer 71, the signal representing the sum being added linearly, after impedance matching by means of a transistor 72, in a resistive 73 to the signal issuing from phase shifter 25.

If the angle formed by the direction of the target T and the axis of the scanning cone of an electromechanical scanning system is designated by $\gamma$, as in FIG. 3, and the amplitude-modulation index of the echo signal received is designated by $m = k\gamma$, in which k is a characteristic of the aerial of the electromechanical scanning system expressed in percent per degree of deviation $\gamma$, it is known that the signal delivered by an aerial of this radar system, for a single plane of deviation (in elevation or azimuth) is given by the formula:

$$V(1 + m\cos\Omega t)\cos\omega t, \quad (1)$$

in which $\omega$ is the pulsatance of the carrier wave, V the mean level of the signal received and $\Omega$ the angular velocity of the scanning beam.

It is likewise known that the echo signals delivered by a monopulse-radar aerial, as in FIG. 2, after frequency changing, considering the same deviation plane as above, are given by the formulas:

$$s = \Sigma \cos\omega t \quad (2)$$

and $$d = \Delta \cos\omega t \quad (3)$$

wherein s designates the signal delivered by the phase shifter 25, d the signal delivered by the amplifier 23, Σ and Δ have the significance indicated above with reference to FIG. 2, and $\omega$ is again the pulsatance of the carrier wave.

After heterodyning in the modulator 50, the signal $d$ is transformed into a signal:

$$d' = g \Delta \cos \omega t \cos \Omega t \qquad (4)$$

in which $\Omega$ is the pulsatance of the simulated sweep and $g$ is the gain of the modulator.

If, the adder 73 having the gain $g'$, signal $d'$ *is combined with signal signal s*, the output of the adder 73 is a signal having the form:

$$E = g' [\Sigma \cos \omega t + g \Delta \cos \omega t \cos \Omega t] \qquad (5)$$

$$E = g' \Sigma [1 + g \Delta/\Sigma \cos \Omega t] . \cos \omega t \qquad (6)$$

that is to say a signal having the same form as that supplied by a radar aerial with electromechanical scanning in which the amplitude-modulation index, $g \Delta/\Sigma$, is that of the aerial of the monopulse system, as can clearly be seen by comparison of the formulas (1) and (6).

The conversion system according to the invention, which effects amplitude modulation with double sideband and carrier suppression, therefore permits the transformation of a signal as delivered by a monopulse-radar aerial into a signal adapted to be used by a processing network of an electromechanical scanning radar.

What is claimed is:

1. A radar installation comprising:
   a monopulse radar receiver provided with an aerial centered on an axis and several channels for the generation of input signals derived from echoes picked up by said aerial, said channels including a first and a second channel respectively delivering a first and a second error signal measuring deviations of the direction of incidence of said echoes from the aerial axis in two mutually orthogonal planes;
   a generator of two conjugate oscillations;
   first and second modulator means in said first and second channels connected to said generator for respectively heterodyning said first and second error signals with said conjugate oscillations;
   adding means for merging the outputs of said first and second modulator means into a combined signal; and
   first and second demodulator means beyond said adding means connected to said generator and to said adding means for deriving from said combined signal respective output signals proportional to said deviations.

2. An installation as defined in claim 1 wherein said channels include a third channel delivering a summing signal to said adding means.

3. An installation as defined in claim 2, further comprising a 90° phase shifter in said third channel.

4. An installation as defined in claim 3 wherein each of said modulator means comprises a pair of matched field-effect transistors with gates connected in parallel to the respective channel and with sources connected to said generator.

5. An installation as defined in claim 4, further comprising a pair of amplifiers respectively inserted between said sources and said generator, said amplifiers having the same gain but introducing a relative 180° phase shift in the energization of said sources from said generator.

6. An installation as defined in claim 5 wherein said field-effect transistors are provided with potentiometer means for adjusting their neutral point.

7. An installation as defined in claim 1 wherein said modulator means are double-sideband amplitude modulators with carrier suppression.

8. An installation as defined in claim 1 wherein said adding means comprises a resistive summing circuit.

9. An installation as defined in claim 1 wherein said aerial comprises four quadrantal wave collectors grouped about said axis.

* * * * *